US006451089B1

(12) United States Patent
Marsden et al.

(10) Patent No.: US 6,451,089 B1
(45) Date of Patent: Sep. 17, 2002

(54) PROCESS FOR DIRECT ELECTROWINNING OF COPPER

(75) Inventors: John O. Marsden, Phoenix; Robert E. Brewer, Safford; Joanna M. Robertson, Thatcher, all of AZ (US); David R. Baughman, Golden, CO (US); Philip Thompson, West Valley City, UT (US); Wayne W. Hazen, Lakewood; Christel M. A. Bemelmans, Indian Hills, both of CO (US)

(73) Assignee: Phelps Dodge Corporation, Phoenix, AZ (US)

( * ) Notice: Subject to any disclaimer, the term of this patent is extended or adjusted under 35 U.S.C. 154(b) by 0 days.

(21) Appl. No.: 09/912,921

(22) Filed: Jul. 25, 2001

(51) Int. Cl.$^7$ .................................................. C22B 3/06

(52) U.S. Cl. ........................... 75/744; 205/367; 423/34

(58) Field of Search ......................... 75/744; 205/367; 423/34

(56) References Cited

U.S. PATENT DOCUMENTS

| | | | |
|---|---|---|---|
| 3,260,593 A | | 7/1966 | Zimmerley et al. |
| 3,528,784 A | | 9/1970 | Green |
| 3,637,371 A | | 1/1972 | Mackiw et al. |
| 3,656,888 A | | 4/1972 | Barry et al. |
| 3,669,651 A | | 6/1972 | Spedden et al. |
| 3,868,440 A | | 2/1975 | Lindblad et al. |
| 3,896,208 A | | 7/1975 | Dubeck et al. |
| 3,917,519 A | * | 11/1975 | Fisher et al. ................. 205/584 |
| 3,949,051 A | * | 4/1976 | Pawlek et al. ................. 241/16 |
| 3,958,985 A | | 5/1976 | Anderson |
| 3,961,028 A | | 6/1976 | Parker et al. |
| 3,962,402 A | | 6/1976 | Touro |
| 3,985,553 A | | 10/1976 | Kunda et al. |
| 3,991,159 A | | 11/1976 | Queneau et al. |
| 4,017,309 A | | 4/1977 | Johnson |

(List continued on next page.)

FOREIGN PATENT DOCUMENTS

AU 0219785 * 12/1958

OTHER PUBLICATIONS

L.W. Beckstead, et al., "Acid Ferric Sulfate Leaching of Attritor–Ground Chalcopyrite Concentrate," vol. 11, Extractive Metallurgy of Copper, Ch. 31, pp. 611–32, Published by American Institute of Mining, Metallurgical, and Petroleum Engineers, Inc. 1976.*

Evans, et al., "International Symposium of Hydrometallurgy," Mar. 1, 1973, 2 pages.

Duyesteyn, et al., "The Escondida Process for Copper Concentrates," 1998, No Month.

King, et al., "The Total Pressure Oxidation of Copper Concentrates," 1993, No Month.

King, J.A., "Autoclaving of Copper Concentrates," paper from COPPER 95, vol. III: Electrorefining and Hydrometallurgy of Copper, International Conference held in Santiago, Chile, Nov. 1995.

Mackis, V. N., "Direct Acid Pressure Leaching of Chalcocite Concentrate," vol. 19, No. 2, Feb. 1967.

(List continued on next page.)

Primary Examiner—Roy King
Assistant Examiner—Tima McGuthry-Banks
(74) Attorney, Agent, or Firm—Snell & Wilmer

(57) ABSTRACT

A system and process for recovering copper from a copper-containing ore, concentrate, or other copper-bearing material to produce high quality cathode copper from a leach solution without the use of copper solvent extraction techniques or apparatus. A process for recovering copper from a copper-containing ore generally includes the steps of providing a feed stream containing communicated copper-containing ore, concentrate, or other copper-bearing material, leaching the feed stream to yield a copper-containing solution, conditioning the copper-containing solution through one or more physical or chemical conditional steps, and electowinning copper directly from the copper-containing solution, without subjecting the copper-containing solution to solvent extraction.

23 Claims, 2 Drawing Sheets

U.S. PATENT DOCUMENTS

| | | | |
|---|---|---|---|
| 4,020,106 A | | 4/1977 | Ackerley et al. |
| 4,028,462 A | | 6/1977 | Domic et al. |
| 4,029,733 A | | 6/1977 | Faugeras et al. |
| 4,039,405 A | | 8/1977 | Wong |
| 4,039,406 A | | 8/1977 | Stanley et al. |
| 4,046,851 A | | 9/1977 | Subramanian et al. |
| 4,069,119 A | | 1/1978 | Wong |
| 4,091,070 A | | 5/1978 | Riggs et al. |
| 4,093,526 A | * | 6/1978 | Blanco et al. .............. 205/584 |
| 4,120,935 A | | 10/1978 | Fountain et al. |
| 4,150,976 A | | 4/1979 | Dain |
| 4,157,912 A | | 6/1979 | Weir et al. |
| 4,165,362 A | | 8/1979 | Reynolds |
| 4,256,553 A | | 3/1981 | Beczek et al. |
| 4,266,972 A | | 5/1981 | Redondo-Abad et al. |
| 4,272,341 A | | 6/1981 | Lamb |
| 4,338,168 A | | 7/1982 | Stanley et al. |
| 4,405,569 A | | 9/1983 | Dienstbach |
| 4,415,540 A | | 11/1983 | Wilkomirsky et al. |
| 4,442,072 A | | 4/1984 | Baglin et al. |
| 4,507,268 A | | 3/1985 | Kordosky et al. |
| 4,571,264 A | | 2/1986 | Weier et al. |
| 4,619,814 A | | 10/1986 | Salter et al. |
| 4,775,413 A | | 10/1988 | Horton et al. |
| 4,814,007 A | | 3/1989 | Lin et al. |
| 4,875,935 A | | 10/1989 | Gross et al. |
| 4,880,607 A | | 11/1989 | Horton et al. |
| 4,892,715 A | | 1/1990 | Horton |
| 4,895,597 A | | 1/1990 | Lin et al. |
| 4,971,662 A | | 11/1990 | Sawyer et al. |
| 4,992,200 A | | 2/1991 | Lin et al. |
| 5,028,259 A | | 7/1991 | Lin et al. |
| 5,059,403 A | | 10/1991 | Chen |
| 5,073,354 A | | 12/1991 | Fuller et al. |
| 5,176,802 A | | 1/1993 | Duyvesteyn et al. |
| 5,223,024 A | | 6/1993 | Jones |
| 5,232,491 A | * | 8/1993 | Corrans et al. ............... 423/27 |
| 5,316,567 A | * | 5/1994 | Jones .......................... 423/24 |
| 5,356,457 A | | 10/1994 | Alvarez et al. |
| 5,670,035 A | | 9/1997 | Virnig et al. |
| 5,698,170 A | | 12/1997 | King |
| 5,730,776 A | * | 3/1998 | Collins et al. ................ 423/27 |
| 5,770,170 A | | 6/1998 | Collins et al. |
| 5,849,172 A | | 12/1998 | Allen et al. |
| 5,895,633 A | | 4/1999 | King |
| 5,902,474 A | | 5/1999 | Jones |
| 5,917,116 A | | 6/1999 | Johnson et al. |
| 5,989,311 A | | 11/1999 | Han et al. |

OTHER PUBLICATIONS

Hirsch, H. E., "Leaching of Metal Sulphides," Patents, UK, No. 1,598,454, 7 pages, No Month.

Chimielewski, T., "Pressure Leaching of a Sulphide Copper Concentrate with Simultaneous Regeneration of the Leaching Agent," Hydrometallurgy, vol. 13, No. 1, 1984, pp. 63–72, No Month.

Dannenberg, R. O., "Recovery of Cobalt and Copper From Complex Sulfide Concentrates," Government Report, 20 pages, Report No. BM RI 9138, U.S. Dept. of the Interior, 1987, No Month.

Berezowsky, R.M.G.S., "The Commercial Status of Pressure Leaching Technology," JOM, vol. 43, No. 2, 1991, pp. 9–15, No Month.

Hacki, R. P., "Effect of Sulfur–Dispersing Surfactants on the Oxygen Pressure Leaching of Chalcopyrite," paper from COPPER 95, vol. III, pp. 559–577, Met Soc of CIM, Nov. 1995.

Hackl, R.P., "Passivation of Chalcopyrite During Oxidative Leaching in Sulfate Media," Hydrometallurgy, vol. 39, 1995, pp. 25–48.

Jim A. King, et al., paper entitled: "The Total Pressure Oxidation of Copper Concentrates," vol. 1, Fundamental Aspects, 1993, No Month.

Dreisinger, D. B., "Total Pressure Oxidation of El Indio Ore and Concentrate," COPPER 1999, Fourth International Conference, Phoenix, Arizona, USA, Oct. 1999.

Richmond, G. D., "The Commissioning and Operation of a Copper Sulphide Pressure Oxidation Leach Process at Mt. Gordon," Alta Copper 1999: Copper Sulphides Symposium & Copper Hydrometallurgy Forum, Gold Coast, Queensland, Australia Conference, 1999, No Month.

* cited by examiner

PROCESS FOR DIRECT ELECTROWINNING OF COPPER

FIELD OF THE INVENTION

The present invention relates generally to a process for recovering copper from a copper-containing ore, concentrate, or other copper-bearing material, and more specifically, to a process for producing cathode copper without the use of solvent/solution extraction, ion exchange of copper, or related processes to refine and concentrate the copper-bearing solution.

BACKGROUND OF THE INVENTION

Hydrometallurgical treatment of copper containing materials, such as copper ores, concentrates, and other copper-bearing materials, has been well established for many years. Currently, there exist many creative approaches to the hydrometallurgical treatment of these materials; however, common to almost all of the processes either now known or under development is the use of solvent extraction and electrowinning (SX-EW) for solution purification and copper recovery. Although SX-EW is not without its drawbacks, the proven success in the copper SX-EW field has made this approach standard for production of high quality copper products.

The traditional hydrometallurgical process for copper recovery involves first leaching copper-containing material with an acidic solution, either atmospherically or under conditions of elevated temperature and pressure. The resultant process stream—the so-called pregnant leach solution—is recovered, and in a solvent extraction (or solution extraction, as it is sometimes called) stage, is mixed with an organic solvent (i.e., an extractant), which selectively removes the copper from the pregnant leach solution. The copper-loaded extractant is then mixed with an aqueous acid solution, which strips the copper from the extractant, producing a solution stream suitable for electrowinning. This resultant solution stream is highly concentrated and relatively pure, and typically is processed into high quality copper cathode in an electrowinning circuit.

In general, electrowinning of copper consists of the electrolytic deposition (sometimes called "plating") of copper onto a cathode and the evolution of oxygen at an anode. In a simple design of an exemplary electrowinning unit, a set of cathodes and anodes are set in a reaction chamber containing the copper-containing electrolyte. When the unit is energized, copper ions are reduced onto the cathode (i.e., plated). Plating of copper typically occurs on copper starter sheets or stainless steel blanks. Anodes are quasi-inert in the electrolyte and provide a surface for oxygen evolution. The copper plates produced by the electrowinning unit can be in excess of 99.99 percent pure.

Purification of copper from the pregnant leach solution by solvent extraction has proven to be a successful means of providing a concentrated copper solution suitable for electrowinning of highly pure copper metal. Direct electrowinning of copper—that is, plating of copper directly from the pregnant leach solution without the intervening step of purification by solvent extraction—is known. However, the copper recovered by such so-called direct electrowinning processes often is too impure for sale or use as is, and thus, generally must be further refined at an additional cost, or may be sold at a discount. More specifically, prior art techniques have shown the ability for direct electrowinning of copper to produce a relatively low-quality copper product.

An effective and efficient method to recover copper from copper-containing materials, especially copper from copper sulfides such as chalcopyrite and chalcocite, that enables high copper recovery to be achieved at a reduced cost over conventional processing techniques would be advantageous.

SUMMARY OF THE INVENTION

While the way in which the present invention addresses the deficiencies and disadvantages of the prior art is described in greater detail hereinbelow, in general, according to various aspects of the present invention, a process for recovering copper and other metal values from a copper-containing material includes obtaining a copper-containing solution from, for example, a pressure leaching system, and then appropriately conditioning the copper-containing solution for electrowinning. In a preferred aspect of the invention, the composition of the copper-containing solution is similar to the composition of the electrolyte produced by a solvent extraction circuit, for example, with respect to acid and copper concentrations. In accordance with the various embodiments of the present invention, however, the copper-containing solution is not subjected to solvent extraction.

In accordance with an exemplary embodiment of the present invention, a process for recovering copper from a copper-containing material generally includes the steps of (i) providing a feed stream containing copper-containing material; (ii) subjecting the copper-containing feed stream to atmospheric leaching or pressure leaching to yield a copper-containing solution; (iii) conditioning the copper-containing solution through one or more chemical or physical conditioning steps; and (iv) electrowinning copper directly from the copper-containing solution, without subjecting the copper-containing solution to solvent extraction. As used herein, the term "pressure leaching" shall refer to a metal recovery process in which material is contacted with an acidic solution and oxygen under conditions of elevated temperature and pressure.

In one aspect of a preferred embodiment of the invention, one or more processing steps are used in order to separate copper from the acid in a recycled portion of the lean electrolyte from the direct electrowinning process, thus enabling the rejection of a portion of the acid component from the process circuit without rejecting a significant portion the copper. As discussed in greater detail hereinbelow, a number of conventional or hereafter devised processes may be utilized to separate copper from acid in the feed stream. For example, in accordance with one aspect of an exemplary embodiment of the invention, a copper precipitation step may be utilized to precipitate solubilized copper from a lean electrolyte stream onto the surfaces of solid particles in a copper-containing material stream in advance of the pressure leaching step, thus separating the copper from the acid solution.

In an aspect of another embodiment of the invention, a recycle circuit is used intermediate to the leaching and electrowinning steps to facilitate control of the composition of copper-containing solution entering the electrowinning stage, and to thus enhance the quality of the copper recovered therefrom.

In accordance with various preferred aspects of the present invention, by providing for the electrowinning of copper directly from a copper-containing solution without first subjecting the copper-containing solution to solvent extraction, the present invention enables lower-cost recovery of copper and eliminates the expenses associated with solvent extraction, such as specialized reagents, process apparatus and equipment, and energy resources. Furthermore, in accordance with one preferred aspect of the invention, careful control of the composition of the copper-containing solution entering the electrowinning circuit enables production of high quality, uniformly-plated cathode copper.

These and other advantages of a process according to various aspects of the present invention will be apparent to those skilled in the art upon reading and understanding the following detailed description with reference to the accompanying figures.

BRIEF DESCRIPTION OF THE DRAWING

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION OF EXEMPLARY EMBODIMENTS

Figure 1:
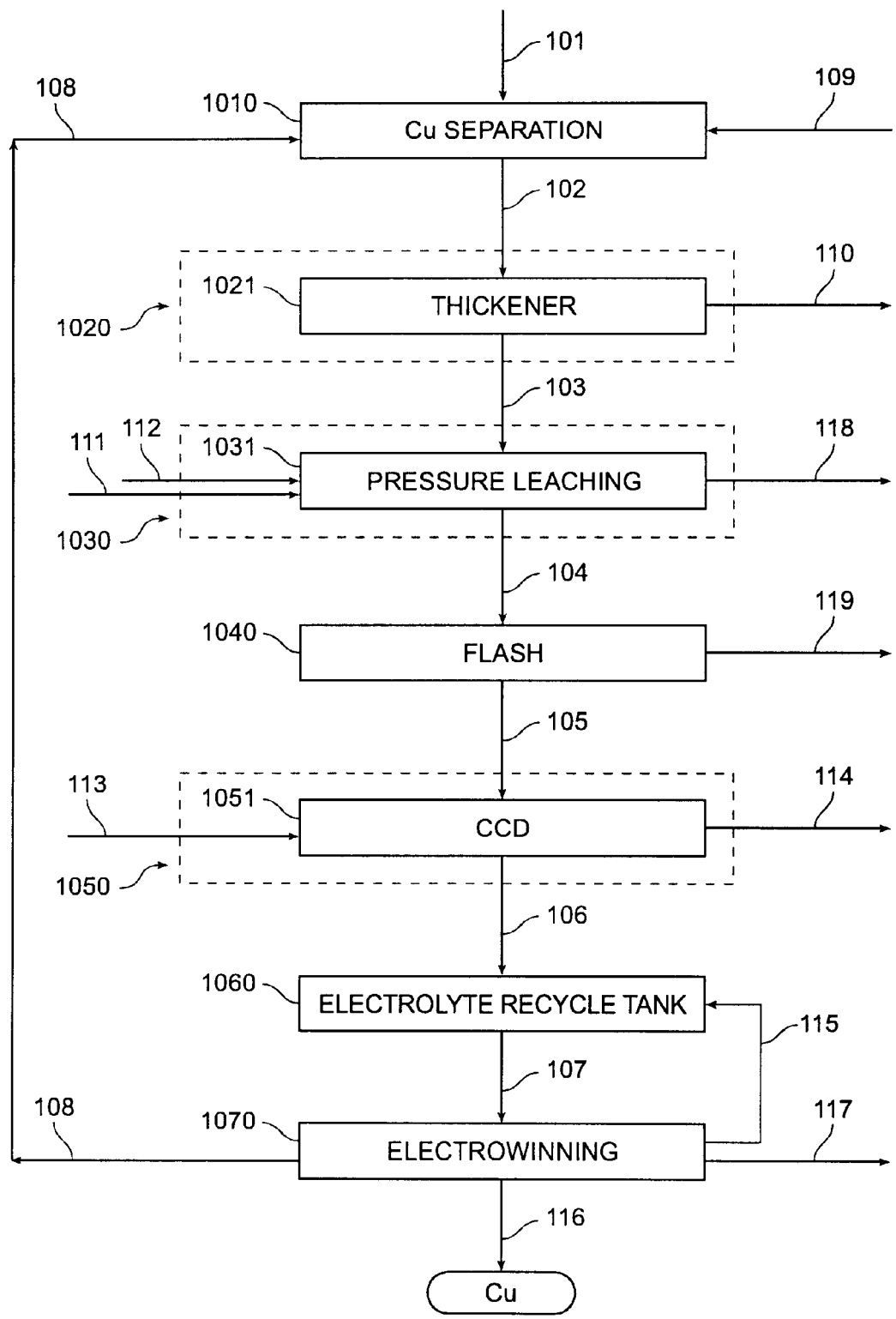
FIG. 1 illustrates a flow diagram of a copper recovery process in accordance with an exemplary embodiment of the present invention.

The present invention exhibits significant advancements over prior art processes, especially other so-called "direct electrowinning" processes, particularly with regard to product quality and process efficiency. Moreover, existing copper recovery processes that utilize a conventional atmospheric or pressure leaching/solvent extraction/electrowinning process sequence may, in many instances, be easily retrofitted to exploit the many commercial benefits the present invention provides.

In one aspect of a preferred embodiment of the invention, the relatively large amount of acid generated during the electrowinning stage as a copper-containing electrolyte stream is transported out of the copper recovery process after a separation step in which substantially all of the copper is removed from the acid stream. It is generally economically advantageous to utilize this generated acid stream in some way, rather than to neutralize or dispose of it. Thus, as discussed in greater detail hereinbelow, the present invention may find particular utility in combination with conventional atmospheric leaching operations, such as, for example, heap leaching, vat leaching, dump or stockpile leaching, pad leaching, agitated tank leaching, and bacterial leaching operations, which often require a substantially continuous acid supply.

In one aspect of an exemplary embodiment of the present invention, a feed stream containing copper-containing material is provided for processing. In accordance with the various embodiments of present invention, the copper-containing material may be an ore, a concentrate, or any other copper-bearing material from which copper and/or other metal values may be recovered. The copper in the copper-containing material may be in the form of copper oxides, copper sulfides or other copper minerals, and the copper-containing material may include any number of a variety of other metals, such as, for example, gold, platinum group metals, silver, zinc, nickel, cobalt, molybdenum, rare earth metals, rhenium, uranium and mixtures thereof. Various aspects and embodiments of the present invention prove especially advantageous in connection with the recovery of copper from copper sulfide ores, such as, for example, chalcopyrite ($CuFeS_2$), chalcocite ($Cu_2S$), bornite ($Cu_5FeS_4$), and covellite ($CuS$).

The feed stream of copper-containing material can be provided in any number of ways, such that the conditions of the feed stream are suitable for the chosen processing methods. For example, feed stream conditions such as particle size, composition, and component concentrations can affect the overall effectiveness and efficiency of downstream processing operations, such as, for example, atmospheric leaching or pressure leaching.

In accordance with a preferred aspect of the invention, the particle size of the copper-containing feed material is reduced to facilitate fluid transport and to optimize the processing steps of atmospheric or pressure leaching and subsequent metal recovery processes. A variety of acceptable techniques and devices for reducing the particle size of the copper-containing material are currently available, such as ball mills, tower mills, ultrafine grinding mills, attrition mills, stirred mills, horizontal mills and the like, and additional techniques may later be developed that may achieve the desired result of increasing the surface area of the material to be processed. With regard to one aspect of a preferred embodiment of the invention, such a result is desired because the reaction rate during leaching generally increases as the surface area of the copper-containing material increases, such that increasing the fineness of the copper-containing material before subjecting the material stream to pressure leaching generally will allow for more moderate temperature and pressure conditions to be employed within the pressure leaching vessel, and may reduce the residence time of the oxidation reaction during pressure leaching.

FIG. 1 illustrates an exemplary embodiment of the present invention wherein copper is the metal to be recovered from a copper-containing material, such as a sulfide ore. In preparation for froth flotation, the copper-containing material feed stream is ground to a particle size suitable to liberate mineral-bearing particles from gangue materials. In one aspect of a preferred embodiment, copper-containing material is communicated using, for example, a ball mill, and subjected to conventional flotation techniques and practices. In one aspect of the present invention, the copper-containing material has a P80 of less than about 250 microns, preferably a P80 from about 75 to about 150 microns, with the optimal size depending on flotation and liberation characteristics. The product from flotation preferably has a P80 of less than about 150 microns, and more preferably a P80 on the order of from about 5 to about 75 microns. Other particle sizes and distributions that facilitate fluid transport and subsequent processing may, however, be utilized.

In another aspect of a preferred embodiment of the present invention, the communicated copper-containing material is combined with a liquid to form a copper-containing material stream 101. Preferably, the liquid comprises water, but any suitable liquid may be employed, such as, for example, raffinate, pregnant leach solution, or lean electrolyte. For example, a portion of lean electrolyte stream 108 from the direct electrowinning process may be combined with communicated copper-containing material to form copper-containing material stream 101 (not shown in FIG. 1).

The combination of the liquid with the copper-containing material can be accomplished using any one or more of a variety of techniques and apparatus, such as, for example, in-line blending or using a mixing tank or other suitable vessel. In accordance with a preferred aspect of this embodiment, the material stream is concentrated with the copper-containing material being on the order less than about 50 percent by weight of the stream, and preferably about 40 percent by weight of the stream. Other concentrations that are suitable for transport and subsequent processing may, however, be used.

In accordance with one aspect of the present invention, it is desirable to separate the copper in a recycled stream of lean electrolyte from electrowinning from the acid, and also to reduce the amount of contaminants in the portion of the stream to be subjected to the metal recovery process. In such a separation process, the acid that is removed from the recycled lean electrolyte stream may be rejected from the process circuit, taking with it at least a portion of the metal contaminants and other soluble impurities from the copper-containing feed stream and the recycled lean electrolyte stream. Any number of conventional or hereafter devised separation processes and techniques may be useful to achieve the separation of copper from acid in the feed stream. For example, separation processes and/or techniques such as precipitation, low temperature pressure leaching, acid solvent extraction/ion exchange, membrane separation, cementation, pressure reduction, sulfiding, and/or the use of liberator cells may be useful for this purpose.

The separation aspect of a preferred embodiment of the invention contributes to providing a resultant acid stream that contains a relatively small fraction of copper, which can be used for leaching, pH control, or other applications. Moreover, utilization of a separation process in accordance with this aspect of the invention may be particularly advantageous in that it may enable contaminants from the unrefined copper-containing material stream to be removed from the copper-containing material stream and incorporated into the resultant acid stream. Because the resultant acid stream is preferably removed from the metal recovery process altogether and utilized in remote operations, disposed of, or neutralized, the contaminants contained therein are likewise removed from the metal recovery process and are thus prevented from accumulating in the process stream. This may be a significant advantage in that such contaminants, particularly metal contaminants, typically have a deleterious effect on the effectiveness and efficiency of the desired metal recovery process. For example, metal contaminants and other impurities in the process stream, if not carefully controlled and/or minimized, can contribute to diminished physical and/or chemical properties in the cathode copper produced by electrowinning, and can thus degrade the copper product and diminish its economic value.

Referring again to FIG. 1, in accordance with one aspect of a preferred embodiment of the invention, copper-containing material stream 101 is subjected to a separation, such as, for example, a precipitation step, which, in this exemplary process, serves to precipitate solubilized copper from a recycled lean electrolyte stream onto the surfaces of solid particles in the copper-containing material stream. As discussed in detail above, this aspect offers an important advantage in that it enables recovery of copper from a lean electrolyte stream that otherwise may have been lost or would have required additional processing to recover, potentially resulting in significant economic benefits.

In this preferred aspect of the invention, the precipitation step involves the copper-containing material stream being combined with a sulfur dioxide ($SO_2$) stream 109 and a lean electrolyte stream 108 in a suitable processing vessel. For example, in the embodiment illustrated in FIG. 1, lean electrolyte stream 108 may comprise a recycled acidic copper sulfate stream generated during an electrowinning operation. Other streams, however, preferably copper-rich streams, may also be used. In one aspect of this embodiment of the invention, lean electrolyte stream 108 has an acid concentration of from about 20 to about 200 grams/liter, preferably from about 30 to about 150 grams/liter, and most preferably from about 50 to about 120 grams/liter. In a further aspect of this embodiment of the invention, lean electrolyte stream 108 has a copper concentration of from about 20 to about 55 grams/liter, preferably from about 25 to about 50 grams/liter, and most preferably from about 30 to about 45 grams/liter. In copper precipitation stage 1010, copper from lean electrolyte stream 108 precipitates to form a desired copper-rich concentrate. Preferably, precipitation is carried out such that the copper from the lean electrolyte precipitates, at least in part, onto the surface of unreacted copper-containing material particles within stream 101 in the form of copper sulfides, such as, for example, CuS. While not wishing to be bound by any particular theory, the chemical reaction during this exemplary copper precipitation step—wherein, for example, the copper-containing material is primarily chalcopyrite—is believed to be as follows:

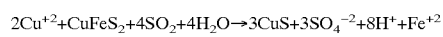

$2Cu^{+2}+CuFeS_2+4SO_2+4H_2O \rightarrow 3CuS+3SO_4^{-2}+8H^{+}+Fe^{+2}$

$CuFeS_2+Cu^{+2} \rightarrow Fe^{+2}+2CuS$ (possible side reaction)

Other copper minerals and other sulfides react to varying degrees according to similar reactions, producing copper precipitates and a weak sulfuric acid by-product. In accordance with a preferred aspect of the invention, copper separation stage 1010 is is carried out at a slightly elevated temperature, such as from about 70° C. to about 180° C., preferably from about 80° C. to about 100° C., and most preferably at a temperature of about 90° C. Heating, if necessary, can be effectuated through any conventional means, such as electric heating coils, a heat blanket, process fluid heat exchange, and other ways now known or later developed. In the exemplary process of FIG. 1, steam generated in other process areas, such as stream 119 from flash tank 1040 or stream 118 from pressure leaching stage 1030, may be directed to the processing vessel in copper separation stage 1010 to provide the heat desired to enhance the precipitation process. The residence time for the copper precipitation process can vary, depending on factors such as the operating temperature of the processing vessel and the composition of the copper-containing material, but typically ranges from about thirty (30) minutes to about 6 hours. Preferably, conditions are selected such that significant amounts of copper are precipitated. For example, precipitation rates on the order of about 98% precipitation of copper have been achieved in processing vessels maintained at about 90° C. for about 4 hours.

Other parameters to consider when conditioning the copper-containing material feed stream for processing are the fraction of solid particles in the feed stream and the total volume of the feed stream. Thus, these or other parameters, such as, for example, temperature, pressure, viscosity, density, composition, and the like, may be suitably addressed. Although these parameters may or may not be significant to the overall efficiency of processing operations downstream in all cases, these parameters can affect equipment size and material specifications, energy requirements, and other important aspects of process design. Thus, calculated adjustment of these stream parameters in advance of complex or resource-intensive processing stages can positively affect the economic efficiency of the chosen process. Solid-liquid separation systems, such as, for example, filtration systems, counter-current decantation (CCD) circuits, thickeners, and the like are useful in adjusting these parameters and are widely used in the industry.

In one aspect of the embodiment of the invention illustrated in FIG. 1, product stream 102, which generally contains covellite/chalcopyrite particles and acid, contains a large fraction of acid generated in pressure leaching stage 1030 and electrowinning stage 1070, and the acid generated in copper separation stage 1010.

In accordance with a preferred aspect of the invention, the copper-containing material stream entering the pressure leaching stage contains from about 10 and about 50 percent solids by weight, preferably from about 20 to about 40 percent solids by weight. To adjust the solids concentration of product stream 102 in accordance with the desired parameters, in accordance with an exemplary embodiment of the invention, product stream 102 is sent to a solid-liquid separation circuit 1020. In one aspect of a preferred embodiment of the invention, solid-liquid separation circuit 1020 preferably includes a wash thickener circuit 1021 comprising multiple thickener stages arranged in a counter-current decantation (CCD) configuration that effectuate separation of a substantial amount of the acid in the product stream from the copper-containing solid particles therein. In the illustrated embodiment, the underflow of thickener circuit 1021 is pressure leaching feed stream 103 and the overflow is acid stream 110. Preferably, acid stream 110 contains only a negligible amount of copper.

Process effluent acid stream 110 may be utilized, processed, neutralized, impounded, and/or disposed of in a variety of ways, the appropriate choice of which is largely dependent upon economic and regulatory factors. In one aspect of the illustrated embodiment, the acid stream can be beneficially used in, for example, an atmospheric leaching operation, where acid is required to leach copper oxide or sulfide minerals. Such a leaching operation may be a heap leach, a vat leach, a tank leach, a pad leach, or any other similar operation. Acid is consumed in these operations through reaction with acid-consuming constituents in the ore.

Figure 2:
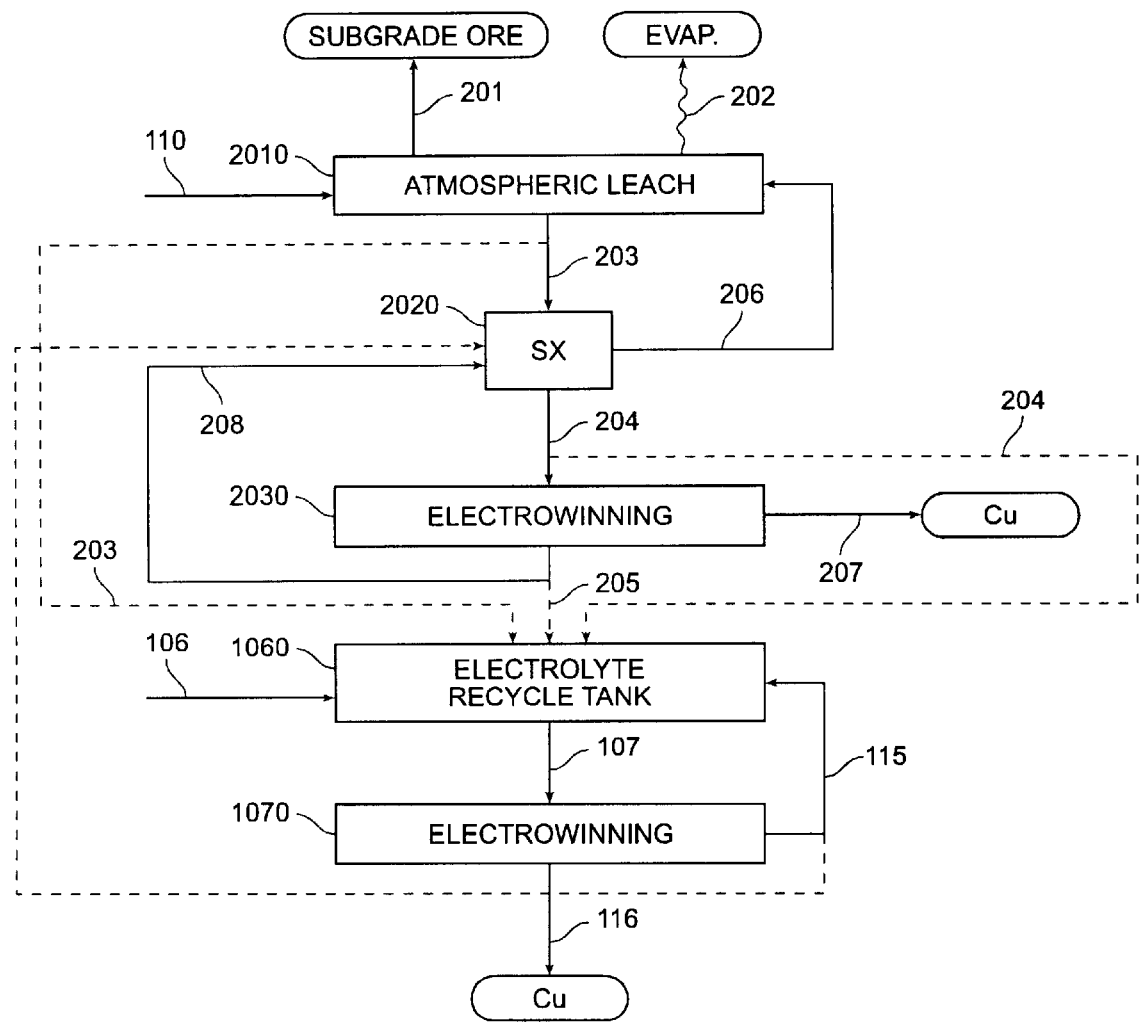
FIG. 2 illustrates a flow diagram of a copper recovery process in accordance with an alternative embodiment of the present invention.

In FIG. 2, acid stream 110 from thickener circuit 1021 (FIG. 1) is sent to a conventional atmospheric leach operation 2010. In accordance with one aspect of a preferred embodiment of the invention, atmospheric leach operation 2010 is a conventional acid-consuming heap leach operation, wherein a subgrade ore 201 is contacted with acid stream 110 and, optionally, other process streams, such as raffinate stream 206 from downstream solvent extraction unit 2020. In heap leach operation 2010, the acid percolates downward through the ore heap, solubilizing the copper in the copper-containing ore in the form of copper sulfate, to form a copper-rich pregnant leach solution (PLS) stream 203. In conventional atmospheric leach operations, PLS stream 203 is sent to a solvent extraction unit, such as solvent extraction unit 2020 in FIG. 2, to produce a high concentration and relatively pure copper sulfate solution suitable for electrowinning. In accordance with an alternative aspect of the present invention illustrated in FIG. 2, PLS stream 203 may not be subjected to solvent extraction, but may instead be blended with other copper-containing process streams, and the resultant stream then sent to an electrowinning circuit. For example, all or a portion of PLS stream 203 (broken line) may be blended with copper-containing solution stream 106 and lean electrolyte stream 115 in electrolyte recycle tank 1060 (from FIG. 1) to form a resultant product stream suitable for electrowinning in an electrowinning circuit.

In accordance with a further aspect of this embodiment of the present invention, as previously briefly mentioned, acid stream 110 advantageously may remove impurities from the process, for example the electrowinning process. Such impurities include, without limitation, iron, aluminum, magnesium, sodium, potassium and the like, often present as sulfates. In the absence of removal, such impurities may accumulate to deleterious levels, and, as such negatively impact production efficiencies and product (e.g. copper cathode) quality. The presence of such impurities in acid stream 110 generally does not negatively impact the aforementioned handling of acid stream 110.

In accordance with one aspect of a preferred embodiment of the invention illustrated in FIG. 2, solvent extraction unit 2020 purifies copper-bearing PLS stream 203 from the heap leach in two unit operations—an extraction operation, which may have multiple stages, followed by a stripping operation. In the extraction stage, PLS stream 203 is contacted with an organic phase consisting of a diluent in which a copper selective reagent (i.e., the extractant) is dissolved. When the solutions are contacted, the organic extractant chemically removes the copper from the PLS, forming an aqueous raffinate stream. The raffinate and organic streams are subsequently separated in a settler. After separation of the organic and aqueous phases in the settler, a portion of the aqueous phase (stream 206) is typically returned to one or more leaching operations to be reloaded with copper from the ore in the atmospheric leach to form the PLS. The organic stream passes on to the second unit operation of the solvent extraction process, the stripping operation. In the stripping operation, the organic stream is contacted with a strongly acidic electrolyte. This acidic solution "strips" the copper from the extractant, leaving the organic phase substantially depleted of copper. At least a portion of the loaded strip solution aqueous phase (stream 204) is advanced to an electrowinning plant 2030 as a copper "rich" solution. Aqueous stream 204 is processed in electrowinning plant 2030 to yield cathode copper 207 and a copper-containing lean electrolyte stream 208, which, in one aspect of a preferred embodiment of the invention, may be recycled in part to solvent extraction unit 2020.

In accordance with one alternative aspect of the invention, aqueous stream 204 may not be subjected to electrowinning immediately after leaving the solvent extraction unit, but may instead be blended with other copper-containing process streams, and the resultant stream then sent to an electrowinning circuit. For example, all or a portion of aqueous stream 204 (broken line) may be blended with copper-containing solution stream 106 and lean electrolyte stream 115 in electrolyte recycle tank 1060 (from FIG. 1) to form a resultant product stream suitable for electrowinning in an electrowinning circuit 1070. In such cases the stripping solutions used in solvent extraction 2020 likely will be comprised of spent electrolyte from electrowinning circuit 1070.

If effluent acid stream 110 is not used as a by-product reagent or otherwise utilized, the acid may be neutralized using, for example, acid-consuming gangue (i.e., mineral processing tailings) or a neutralizing agent, such as limestone or lime. Neutralizing with acid-consuming gangue can be relatively inexpensive, as the neutralizing reagent is essentially free. On the other hand, neutralizing with limestone or lime may be less desirable economically, as both these reagents will incur cost. Nevertheless, should neutralization be desired, any method for acid neutralization now known or hereafter devised may be employed.

Referring again to FIG. 1, the underflow slurry from wash thickener circuit 1021, pressure leaching feed stream 103 in this preferred embodiment of the invention, has a composition of about 40 to about 60 percent solids by weight, the balance being a dilute acid solution. The general composition of the dilute acid solution is dependent upon the ratio of process water to acid introduced in the thickener circuit (i.e., the wash ratio).

In a further aspect of the present invention, the conditioned copper-containing feed stream preferably is subjected to a suitable process, such as pressure leaching, to produce a product slurry 104, which comprises a copper-containing solution and a residue 114. The process may be selected as desired, but, in general, enables production of a copper-containing solution that exhibits copper and acid concentrations similar to an electrolyte stream resulting from a solvent extraction circuit-that is, the copper-containing solution preferably is suitable for processing in an electrowinning circuit. Any suitable technique or combination of techniques that yields an appropriate copper-containing solution without employing solvent extraction techniques may be used. In a preferred embodiment of the invention, as illustrated in FIG. 1, pressure leaching feed stream 103 is subjected to a pressure leaching stage 1030 to yield a copper-containing product slurry 104.

In accordance with one aspect of this embodiment of the present invention, pressure leaching feed stream 103 is transported to a suitable vessel for pressure leaching, which can be any vessel suitably designed contain the process components at the desired temperature and pressure conditions for the requisite processing residence time. In a preferred embodiment, a pressure leaching vessel 1031 is employed for this purpose. Pressure leaching vessel 1031 is preferably a multi-compartment, agitated vessel.

Generally, the chemical conversions that occur during pressure leaching stage 1030 under certain conditions for the solubilization of the copper in copper-containing materials, such as chalcopyrite, chalcocite, or covellite are as follows:

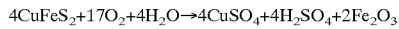

$4CuFeS_2 + 17O_2 + 4H_2O \rightarrow 4CuSO_4 + 4H_2SO_4 + 2Fe_2O_3$

$2Cu_2S + 5O_2 + 2H_2SO_4 \rightarrow 4CuSO_4 + 2H_2O$

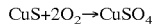

$CuS + 2O_2 \rightarrow CuSO_4$

If desired, conditions during pressure leaching can be controlled such that a portion of the sulfide sulfur contained in the feed stream is converted to elemental sulfur instead of sulfate. The fraction of chalcopyrite and covellite that form sulfur instead of sulfate are believed to react according to the following equations:

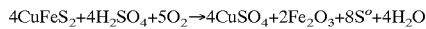

$4CuFeS_2 + 4H_2SO_4 + 5O_2 \rightarrow 4CuSO_4 + 2Fe_2O_3 + 8S^o + 4H_2O$

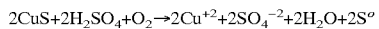

$2CuS + 2H_2SO_4 + O_2 \rightarrow 2Cu^{+2} + 2SO_4^{-2} + 2H_2O + 2S^o$

Pressure leaching, for example in pressure leaching vessel 1031, preferably occurs in a manner suitably selected to promote the solubilization of copper using these (or other) processes. In general, temperature and pressure in the pressure leaching vessel should be carefully controlled. For example, in accordance with one aspect of the invention, the temperature of pressure leaching vessel 1031 is maintained at from about 100° C. to about 250° C., preferably from about 140° C. to about 235° C. In accordance with one aspect of one embodiment of the invention, the temperature of pressure leaching vessel 1031 is advantageously maintained at from about 140° C. to about 180° C. or in the range of from about 150° C. to about 175° C. In accordance with another embodiment of the invention, the temperature of pressure leaching vessel 1031 is advantageously maintained between from about 200° C. to about 235° C. or in the range of from about 210° C. to about 225° C. Furthermore, the total operating pressure in pressure leaching vessel 1031 is necessarily superatmospheric, ranging from about 50 to about 750 psi. In accordance with one aspect of one embodiment of the invention, the pressure is advantageously in the range of between from about 200 to about 450 psi, and more preferably from about 250 to about 400 psi. In accordance with another embodiment of the invention, the pressure is advantageously maintained between from about 400 or about 500 to about 700 psi.

During pressure leaching, it is generally desirable to inject oxygen into the pressure leaching vessel. In one aspect of a preferred embodiment of the invention, during pressure leaching in pressure leaching vessel 1031, sufficient oxygen 112 is injected into the vessel to maintain an oxygen partial pressure in pressure leaching vessel 1031 of from about 50 to about 200 psi, preferably from about 75 to about 150 psi, and most preferably from about 100 to about 125 psi.

Because pressure leaching of many metal sulfides is a highly exothermic process and the heat generated is generally greater than that required to heat pressure leaching feed stream 103 to the desired operating temperature, cooling liquid 111 is preferably contacted with pressure leaching feed stream 103 in pressure leaching vessel 1031 during pressure leaching. Cooling liquid 111 is preferably process water, but can be any suitable cooling fluid from within the refining process or from an outside source. In a preferred embodiment of the invention, a sufficient amount of cooling liquid 111 is added to pressure leaching vessel 1031 to yield a solids content in the product slurry 104 ranging from about 3 to about 15 percent solids by weight.

The residence time for pressure leaching generally depends on a number of factors, including the composition of the copper-containing feed stream and the operating pressure and temperature of the pressure leaching vessel. In one aspect of the invention, the residence time for pressure leaching ranges from about thirty minutes to about three hours.

In another aspect of the present invention, the copper-containing solution is conditioned for electrowinning through one or more chemical and/or physical processing steps. In much the same way that the copper-containing material feed stream is conditioned for processing in accordance with above-described aspects of the invention, the copper-containing solution intended to be utilized in the electrowinning circuit of the present invention is conditioned to adjust the composition, component concentrations, volume, temperature, and/or other physical and/or chemical parameters to desired values. Generally, a properly conditioned copper-containing solution will contain a relatively high concentration of copper in an acid solution and will contain few impurities. Preferably, the conditions of copper-containing solution entering the electrowinning circuit are kept at a constant level to enhance the quality and uniformity of the cathode copper product.

In a preferred aspect of the invention, conditioning of a copper-containing solution for electrowinning begins by adjusting certain physical parameters of the product slurry from the previous processing step. In a preferred embodiment of the invention wherein the previous processing step is pressure leaching, it is desirable to reduce the temperature and pressure of the product slurry. A preferred method of so adjusting the temperature and pressure characteristics of the preferred product slurry is atmospheric flashing.

Thus, in accordance with a preferred aspect of the embodiment illustrated in FIG. 1, product slurry 104 from pressure leaching vessel 1031 is flashed in an atmospheric flash tank 1040 or other suitable atmospheric system to release pressure and to evaporatively cool the product slurry 104 through the release of steam to form a flashed product slurry 105. Flashed product slurry 105 preferably has a temperature ranging from about 90° C. to about 101° C., a copper concentration of from about 40 to about 75 grams/liter, and an acid concentration of from about 20 to about 100 grams/liter. In one aspect of the invention, however, flashed product slurry 105 also contains a particulate solid residue containing, for example, the iron oxide by-product of pressure leaching, other by-products, precious metals and other components that are undesirable for a feed stream to an electrowinning circuit. Thus, in accordance with the same principles discussed above, it is desirable to subject the flashed product slurry to a solid-liquid separation process, such that the liquid portion of the slurry—the desired copper-containing solution-is separated from the solid portion of the slurry—the undesired residue.

Referring again to FIG. 1, in the illustrated embodiment of the invention flashed product slurry 105 is directed to a solid-liquid separation stage 1050, such as a CCD circuit 1051. In an alternative embodiment of the invention, solid-liquid separation stage 1050 may comprise, for example, a thickener or a filter. A variety of factors, such as the process material balance, environmental regulations, residue composition, economic considerations, and the like, may affect the decision whether to employ a CCD circuit, a thickener, a filter, or other suitable device in solid-liquid separation stage 1050. In one aspect of a preferred embodiment of the invention, CCD circuit 1051 uses conventional countercurrent washing of the residue stream with wash water 113 to recover leached copper to the copper-containing solution product and to minimize the amount of soluble copper advancing to either precious metal recovery processes or residue disposal. Preferably, large wash ratios are utilized to enhance the effectiveness of solid-liquid separation stage 1050 —that is, relatively large amounts of wash water 113 are added to the residue in CCD circuit 1051. Preferably, the solution portion of the residue slurry stream is diluted by wash water 113 in CCD circuit 1051 to a copper concentration of from about 5 to about 200 parts per million (ppm) in the solution portion of residue stream 114.

Depending on its composition, residue stream 114 from liquid/solid separation stage 1050 may be impounded, disposed of, or subjected to further processing, such as, for example, precious metal recovery. For example, if residue stream 114 contains economically significant amounts of gold, silver, and/or other precious metals, it may be desirable to recover this gold fraction through a cyanidation process or other suitable recovery process. If gold or other precious metals are to be recovered from residue stream 114 by cyanidation techniques, the content of contaminants in the stream, such as elemental sulfur, amorphous iron precipitates, and unreacted copper minerals, is preferably minimized. Such materials may promote high reagent consumption in the cyanidation process and thus increase the expense of the precious metal recovery operation. As mentioned above, it is therefore preferable to use a large amount of wash water or other diluent during the solid-liquid separation process to maintain low copper and acid levels in the solids-containing residue stream in an attempt to optimize the conditions for subsequent precious metal recovery.

As previously noted, careful control of the conditions of a copper-containing solution entering an electrowinning circuit—especially maintenance of a substantially constant copper composition—can enhance the quality of the electrowon copper by, among other things, enabling even plating of copper on the cathode and avoidance of surface porosity in the cathode copper, which degrades the copper product and thus may diminish its economic value. In accordance with this aspect of the invention, such process control can be accomplished using any of a variety of techniques and equipment configurations, so long as the chosen system and/or method maintains a sufficiently constant feed stream to the electrowinning circuit.

Referring again to FIG. 1, in a preferred aspect of the invention, copper-containing solution stream 106 from solid-liquid separation stage 1050 is sent to an electrolyte recycle tank 1060. Electrolyte recycle tank 1060 suitably facilitates process control for electrowinning circuit 1070, as will be discussed in greater detail below. Copper-containing solution stream 106, which generally contains from about 40 to about 70 grams/liter of copper and from about 15 to about 100 grams/liter acid, is preferably blended with a lean electrolyte stream 115 in electrolyte recycle tank 1060 at a ratio suitable to yield a product stream 107, the conditions of which may be chosen to optimize the resultant product of electrowinning circuit 1070.

Referring briefly to an alternative embodiment of the invention illustrated in FIG. 2, an additional lean electrolyte stream 205 may be blended with lean electrolyte stream 115 and copper-containing solution stream 106 in electrolyte recycle tank 1060 to produce product stream 107 in accordance with the process control principles discussed in connection with the embodiment illustrated in FIG. 1. In one aspect of this alternative embodiment, lean electrolyte stream 205 preferably has a composition similar to that of lean electrolyte stream 115. Further, as discussed above, other streams may be introduced to electrolyte recycle tank 1060 for blending, such as, for example, PLS stream 203 (FIG. 2).

Referring again to FIG. 1, preferably, the copper composition of product stream 107 is maintained substantially constant. While product stream 107 may contain a copper concentration up to the copper solubility level under the prevailing conditions, preferably product stream 107 has a copper concentration of about 20 to about 80 grams/liter, and more preferably of about 30 to about 60 grams/liter, and often above 40 grams/liter. In one aspect of an exemplary embodiment of the invention, control valves are positioned on each of the pipelines feeding lean electrolyte stream 115 and copper-containing solution stream 106 to electrolyte recycle tank 1060 to facilitate blending control within the tank.

With reference to FIG. 1, copper from the product stream 107 is suitably electrowon to yield a pure, cathode copper product. In accordance with the various aspects of the invention, a process is provided wherein, upon proper conditioning of a copper-containing solution, a high quality, uniformly-plated cathode copper product 116 may be realized without subjecting the copper-containing solution to a solvent extraction process prior to entering the electrowinning circuit.

As those skilled in the art are aware, a variety of methods and apparatus are available for the electrowinning of copper and other metal values, any of which may be suitable for use in accordance with the present invention, provided the requisite process parameters for the chosen method or apparatus are satisfied. For the sake of convenience and a broad understanding of the present invention, an electrowinning circuit useful in connection with various embodiments of the invention may comprise an electrowinning circuit, constructed and configured to operate in a conventional manner. The electrowinning circuit may include electrowinning cells constructed as elongated rectangular tanks containing suspended parallel flat cathodes of copper alternating with flat anodes of lead alloy, arranged perpendicular to the long axis of the tank. A copper-bearing leach solution may be provided to the tank, for example at one end, to flow perpendicular to the plane of the parallel anodes and cathodes, and copper can be deposited at the cathode and water electrolyzed to form oxygen and protons at the anode with the application of current. As with conventional electrowinning cells, the rate at which direct current can be passed through the cell is effectively limited by the rate at which copper ions can pass from the solution to the cathode surface. This rate, called the limiting current density, is a function of factors such as copper concentration, diffusion coefficient of copper, cell configuration, and level of agitation of the aqueous solution.

The general chemical process for electrowinning of copper from acid solution is believed to be as follows:

$$2CuSO_4 + 2H_2O \rightarrow Cu^o + 2H_2SO_4 + O_2$$

Cathode half-reaction: $Cu^{2+} + 2e^- \rightarrow Cu^o$

Anode half-reaction: $2H_2O \rightarrow 4H^+ + O_2 + 4e^-$

Turning again to FIG. 1, in a preferred embodiment the invention, product stream 107 is directed from electrolyte recycle tank 1060 to an electrowinning circuit 1070, which contains one or more conventional electrowinning cells.

In accordance with a preferred aspect of the invention, electrowinning circuit 1070 yields a cathode copper product 116, optionally, an off gas stream 117, and a relatively large volume of copper-containing acid, herein designated as lean electrolyte streams 108 and 115. As discussed above, in the illustrated embodiment of the invention, lean electrolyte streams 108 and 115 are directed to copper precipitation stage 1010 and electrolyte recycle tank 1060, respectively. Lean electrolyte streams 108 and 115 generally have a lower copper concentration than product stream 107, but typically have a copper concentration of less than about 40 grams/liter.

The present invention has been described above with reference to a number of exemplary embodiments. It should be appreciated that the particular embodiments shown and described herein are illustrative of the invention and its best mode and are not intended to limit in any way the scope of the invention as set forth in the claims. Those skilled in the art having read this disclosure will recognize that changes and modifications may be made to the exemplary embodiments without departing from the scope of the present invention. For example, although reference has been made throughout to copper, it is intended that the invention also be applicable to the recovery of other metals from metal-containing materials. Further, although certain preferred aspects of the invention, such as techniques and apparatus for conditioning process streams and for precipitation of copper, for example, are described herein in terms of exemplary embodiments, such aspects of the invention may be achieved through any number of suitable means now known or hereafter devised. Accordingly, these and other changes or modifications are intended to be included within the scope of the present invention, as expressed in the following claims.

What is claimed is:

1. A method for recovering copper from a copper-containing material, consisting essentially of:
   providing a feed stream comprising comminuted copper-containing material;
   reacting at least a portion of said feed stream with at least a portion of a copper-containing lean electrolyte steam in an acidic environment to yield a precipitation product stream comprising a solid copper-bearing precipitate;
   subjecting said precipitation product stream to solid-liquid separation to yield a solution stream comprising acid and an inlet stream comprising copper-containing material and the remaining acid;
   optionally, conditioning at least a portion of said inlet steam to alter at least one physical parameter selected from the group consisting of: temperature, pressure, volume, solids content, composition, and density;
   subjecting at least a portion of said inlet stream to pressure leaching to yield a product slurry comprising a copper-containing solution and a residue;
   optionally, reducing the temperature and pressure of said product slurry in a flash tank;
   separating at least a portion of said copper-containing solution from said residue using a physical separation technique;
   optionally, blending at least a portion of said copper-containing solution with at least a portion of one or more copper-containing streams to yield a copper-containing product stream having a desired copper concentration;
   electrowinning copper from said copper-containing solution or said copper-containing product stream to yield cathode copper and a copper-containing lean electrolyte stream;
   optionally, recycling at least a portion of said copper-containing lean electrolyte stream from said electrowinning step to said reacting step;
   optionally, recycling at least a portion of said copper-containing lean electrolyte stream from said electrowinning step to said blending step.

2. The method of claim 1, wherein said step of providing a feed stream comprising communicated copper-containing material comprises providing a feed stream comprising communicated copper sulfide ore or concentrate.

3. The method of claim 1, wherein said step of providing a feed stream comprising communicated copper-containing material comprises providing a feed stream comprising communicated chalcopyrite.

4. The method of claim 1, wherein said reacting step comprises reacting at least a portion of said copper in said copper-containing lean electrolyte stream in the presence of sulfur dioxide, whereby at least a portion of said copper in said copper-containing lean electrolyte stream precipitates as copper sulfide onto at least a portion of the copper-containing material in said feed stream.

5. The method of claim 1, wherein said step of subjecting at least a portion of said inlet stream to pressure leaching comprises subjecting at least a portion of said inlet stream to pressure leaching in a pressure leaching vessel al a temperature of from about 100 to about 250° C. and at a pressure of from about 50 to about 750 psi.

6. The method of claim 5, wherein said leaching step further comprises injecting oxygen into the pressure leaching vessel to maintain an oxygen partial pressure in the pressure leaching vessel of from about 50 to about 200 psi.

7. The method of claim 1, wherein said blending step comprises blending at least a portion of said copper-containing solution with at least a portion of one or more copper-containing streams to achieve a copper concentration of from about 20 to about 75 grams/liter in said copper-containing solution.

8. The method of claim 1, wherein said blending step comprises blending at least a portion of said copper-containing solution with at least a portion of a copper-containing electrolyte stream to achieve a copper concentration of from about 20 to about 75 grams/liter in said copper-containing solution.

9. A method for recovering copper from a copper-containing material, comprising the steps of:
- (a) providing a feed stream comprising a copper-containing material, wherein said copper-containing material comprises a at least one of a copper sulfide ore, a copper sulfide concentrate, or other copper-bearing material;
- (b) reacting at least a portion of said feed stream with at least a portion of a copper-containing electrolyte stream in an acidic environment to yield an inlet stream comprising a solid copper precipitate and acid;
- (c) optionally, reducing the amount of acid in said inlet stream using a solid-liquid separation device;
- (d) leaching at least a portion of said inlet stream in an oxidizing environment at a temperature of from about 100 to about 250° C. and a pressure of from about 50 to about 750 psi to yield a product slurry comprising a copper-containing solution and a residue;
- (e) conditioning said product slurry without the use of solvent extraction techniques to yield a copper-containing product stream suitable for electrowinning, wherein said conditioning step comprises separating at least a portion of said copper-containing solution from said residue using a solid-liquid separation technique and blending at least a portion of said copper-containing solution with at least a portion of a copper-containing electrolyte stream at a blending ratio suitable to yield a copper-containing product stream having a copper concentration of from about 20 to about 75 grams/liter;
- (f) electrowinning copper from said copper-containing product stream to produce cathode copper and a copper-containing lean electrolyte stream.

10. The method of claim 9 further comprising the step of:
- (g) recycling at least a portion of said copper-containing lean electrolyte stream produced in electrowinning step (f) to reacting step (b).

11. The method of claim 9 further comprising the step of:
- (g) recycling at least a portion of said copper-containing lean electrolyte stream produced in electrowinning step (f) to blending step (e).

12. The method of claim 9 further comprising the steps of:
- (g) recycling at least a portion of said copper-containing lean electrolyte stream produced in electrowinning step (f) to reacting step (b); and
- (h) recycling at least a portion of said copper-containing lean electrolyte stream produced in electrowinning step (f) to blending step (e).

13. The method of claim 9, wherein said step of providing a feed stream comprising copper-containing material comprises providing a feed stream comprising copper sulfide ore or concentrate having a P80 of from about 5 to about 75 microns, and wherein said leaching step comprises leaching at least a portion of said inlet stream in an oxidizing environment at a temperature of from about 140 to about 180° C. and at a pressure of from about 200 to about 450 psi.

14. The method of claim 9, wherein said step of providing a feed stream comprising copper-containing material comprises providing a feed stream comprising copper sulfide ore or concentrate having a P80 of from about 5 to about 75 microns, and wherein said leaching step comprises leaching at least a portion of said inlet stream in an oxidizing environment at a temperature of from about 200 to about 235° C. and at a pressure of from about 400 to about 700 psi.

15. The method of claim 9, wherein said reacting step comprises reacting at least a portion of the copper from said copper-containing lean electrolyte stream with sulfur dioxide, whereby at least a portion of said copper in said copper-containing lean electrolyte stream precipitates as copper sulfide onto at least a portion of the copper-containing material in said feed stream.

16. The method of claim 9, wherein said conditioning step further comprises controlling the copper concentration of said copper-containing product stream such that the copper concentration of said copper-containing product stream entering said electrowinning circuit is maintained at a level of about 40 grams/liter.

17. The method of claim 9, wherein said step of reducing the amount of acid in said inlet stream further comprises reducing the impurities in said inlet stream.

18. A method for recovering copper from a copper-containing material, comprising:
- providing a feed stream comprising comminuted copper-containing material;
- reacting at least a portion of said feed stream with at least a portion of a copper-containing lean electrolyte stream in an acidic environment to yield a precipitation product stream comprising a solid copper-bearing precipitate;
- subjecting at least a portion of said precipitation product stream to pressure leaching to yield a copper-containing solution and a residue;
- electrowinning copper from said copper-containing solution to yield cathode copper and a copper-containing lean electrolyte strewn.

19. The method of claim 18, wherein said step of providing a feed stream comprising comminuted copper-containing material comprises providing a feed stream comprising comminuted copper sulfide ore or concentrate.

20. The method of claim 18, wherein said step of providing a feed stream comprising comminuted copper-containing material comprises providing a feed stream comprising comminuted chalcopyrite.

21. The method of claim 18, wherein said step of subjecting at least a portion of said inlet stream to pressure leaching comprises subjecting at least a portion of said inlet stream to pressure leaching in a pressure leaching vessel at a temperature of from about 100 to about 250° C. and at a pressure of from about 50 to about 750 psi.

22. The method of claim 21, wherein said leaching step further comprises injecting oxygen into the pressure leaching vessel to maintain an oxygen partial pressure in the pressure leaching vessel of from about 50 to about 200 psi.

23. The method of claim 18, further comprising the step of recycling at least a portion of said copper-containing lean electrolyte stream from said electrowinning step to said reacting step.

* * * * *